United States Patent [19]

Jones

[11] 4,095,518

[45] Jun. 20, 1978

[54] SECTIONING DEVICE FOR ROUNDED FOOD ARTICLE

[75] Inventor: Frank W. Jones, Marshallton, Del.

[73] Assignee: Fasline Food Equipment Co., Wilmington, Del.

[21] Appl. No.: 727,456

[22] Filed: Sep. 28, 1976

[51] Int. Cl.² .............................................. A47J 17/00
[52] U.S. Cl. .......................................... 99/538; 83/437
[58] Field of Search .......................... 99/509, 537–538, 99/544; 83/437, 451; 30/113.1, 114

[56] References Cited

U.S. PATENT DOCUMENTS

| | | | |
|---|---|---|---|
| 2,479,982 | 8/1949 | Stevens | 83/437 |
| 2,645,262 | 7/1953 | Marasco | 83/437 |
| 3,807,266 | 4/1974 | Camp | 83/431 |
| 3,830,151 | 8/1974 | Gerson | 99/537 |

FOREIGN PATENT DOCUMENTS

| | | | |
|---|---|---|---|
| 379,705 | 8/1964 | Switzerland | 99/537 |

Primary Examiner—Harvey C. Hornsby
Assistant Examiner—Robert Pous
Attorney, Agent, or Firm—Connolly and Hutz

[57] ABSTRACT

A rounded food article, such as a lemon, tomato or apple, is instantaneously divided into a number of radial sections by forcing it through a conical cup of radial blades within which it is impaled on a central spike to which the central ends of the blades are joined. The article is forced through the wedge-shaped spaces between the blades by an annular array of bent rod fingers depending from a head to which an operating handle is attached. The plunger assembly slides over a pair of vertical rods towards the blade assembly engaged within a recess in the base. The fingers extend completely through the blades when the plunger is fully engaged within the blades. The substantial weight of the plunger facilitates its rapid downward movement toward the blade, and a set of three legs raise the base sufficiently from the table to allow the food sections to be freely discharged onto it.

15 Claims, 9 Drawing Figures

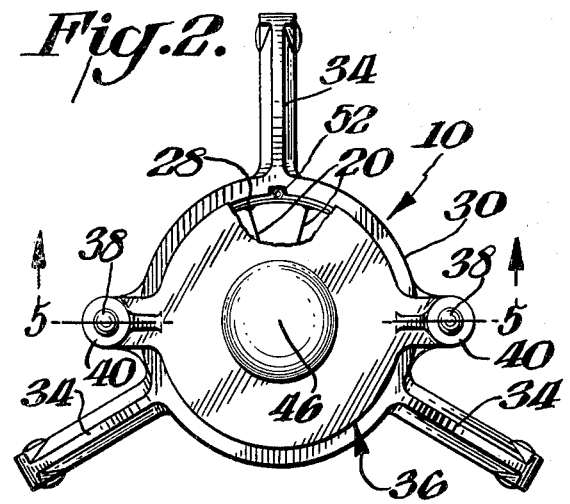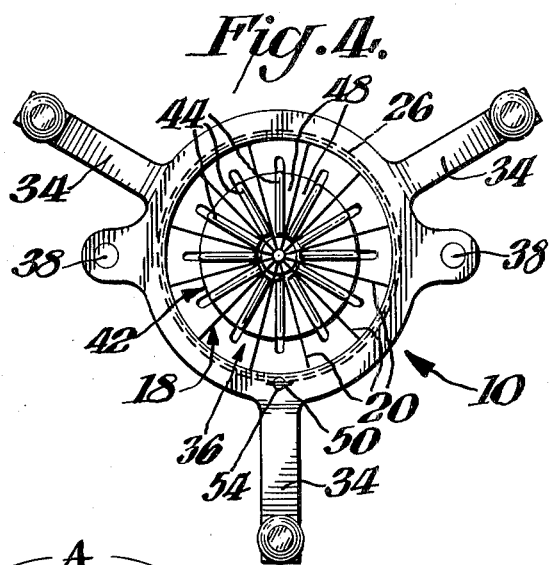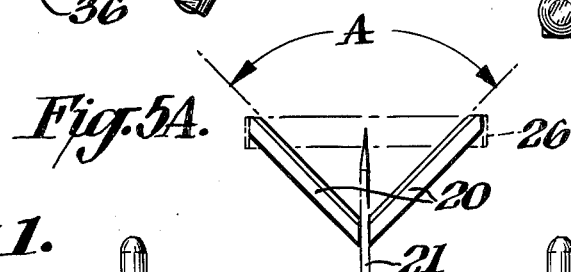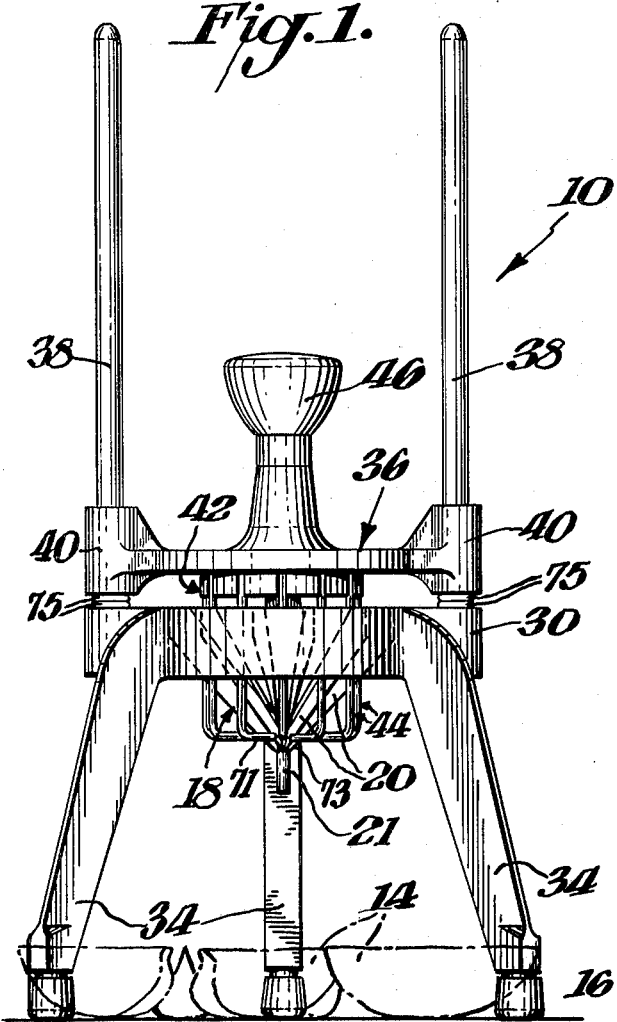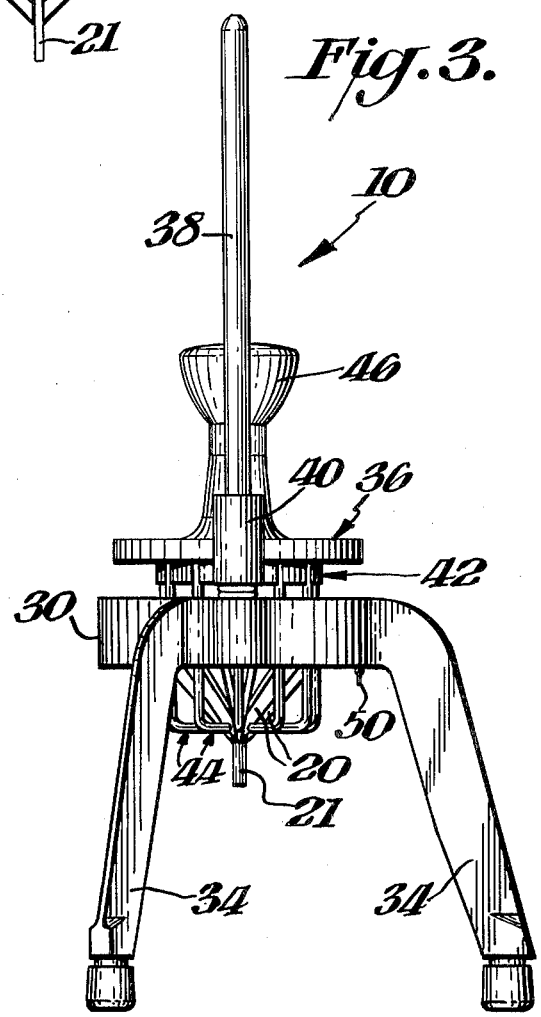

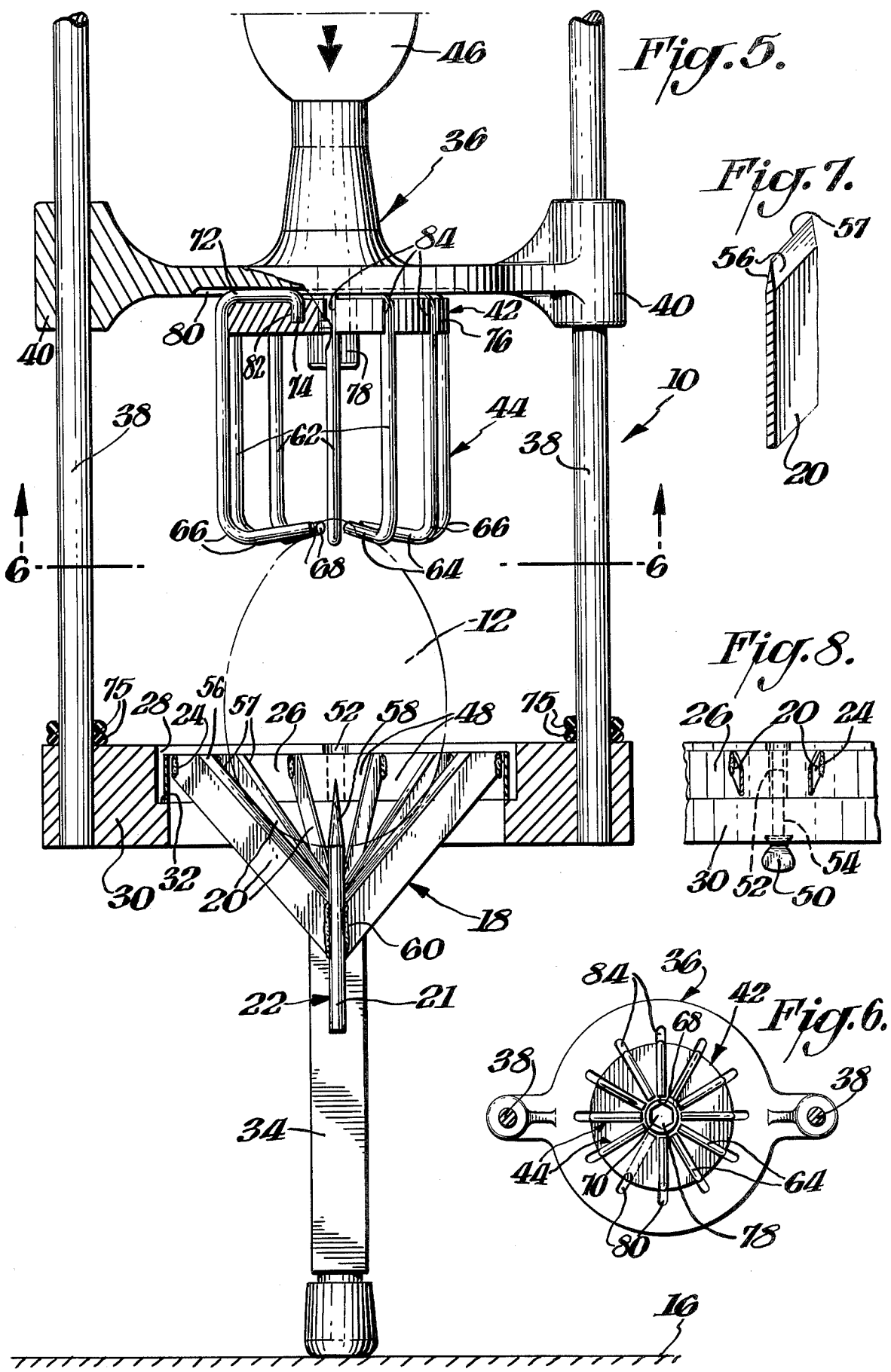

SECTIONING DEVICE FOR ROUNDED FOOD ARTICLE

BACKGROUND OF THE INVENTION

Various fruit sectioning devices have been proposed utilizing relative movement between a conical array of blades and an annular array of holding or pushing elements. These exsiting devices are useful for sectioning relatively firm food articles such as lemons, oranges or apples — as described in U.S. Pat. Nos. 2,645,262, 3,830,151 and Swiss Pat. No. 379,705 (1964). These existing devices are, however, completely effective for sectioning a wide variety of hard skinned as well as relatively soft, tough-skinned rounded food articles such as lemons, limes, oranges, apples, potatoes and tomatoes. An object of this invention is to provide a simple economical and efficient device for sectioning a wide variety of rounded food articles.

SUMMARY

A rounded food article, such as a lemon or tomato, is instantaneously divided into a number of radial sections by forcing it through a conical cup of sharp radial blades within which it is impaled on a central spike. The conical cup of blades is held in an elevated base above which a plunger reciprocates up and down, preferably upon a pair of vertical guides. The plunger includes an annular array of bent rod fingers depending from a head upon which an operating handle is mounted. The fingers are long enough to have their bent lower feet extend completely through the blades in the fully engaged bottom position. The central ends of the blades are joined to the spike which extends upwardly near the tops of the blades and a short distance below their central junction. The spike is thick enough to initiate the radial splitting, which is continued and completed by the blade array. The spike is preferably about 3/16 inch thick, and it has a conical point. The plunger has substantial mass to facilitate application of downward force on the article. The blade array has an included angle ranging from approximately 60° to 120°, preferably from about 75° to 105° and most effective at about 90°. The conical cup of blades is removably mounted in the base to facilitate cleaning and sharpening. The plunger is also removable to facilitate cleaning.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a front view in elevation of one embodiment of this invention in the closed position;

FIG. 2 is a top plan of the embodiment shown in FIG. 1;

FIG. 3 is a side view in elevation of the embodiment shown in FIG. 1;

FIG. 4 is a bottom plan view of the embodiment shown in FIGS. 1-3 with the fingers of the plunger fully engaged within the spaces between the radial blades;

FIG. 5 is a cross-sectional view taken through FIG. 2 along the line 5—5 in an intermediate engaged position;

FIG. 5A is a diagrammatic view showing angle of blades.

FIG. 6 is a cross-sectional view taken through FIG. 5 along the line 6—6;

FIG. 7 is a fragmental cross-sectional view of one of the blades used in the embodiment shown in FIGS. 1-5; and FIG. 8 is a fragmental cross-sectional view of securing the conical cup of blades on the base of the embodiment shown in FIGS. 1-5.

DESCRIPTION OF THE PREFERRED EMBODIMENT

In FIGS. 1-8, is shown sectioning device 10 for dividing a rounded food article, such as lemon 12, into a number of wedge-shaped sections or slices 14, which are discharged onto table 16. FIGS. 4 and 5 show conical cup 18 of sharp radial blades 20 mounted about the stem 21 of central spike 22 and with flattened outer edges 24 secured inside outer ring 26. FIG. 5 shows conical blade cup 18 mounted within cylindrical recess 28 in base 30 and resting on shoulder 32 at the bottom of recess 28. A set of three legs 34 supports base 30 far enough above work table surface 16 to freely discharge wedges or slices from it.

FIG. 5 also shows lemons 12 disposed inside of conical cup 18 of blades and impaled on the upwardly protruding spike 22 in alignment for engagement by plunger 36 mounted above base 30 on linear slide guide means comprised of a pair of smooth round vertical rods 38 mounted upon base 30 and a pair of sleeve bearings 40 connected to the sides of plunger 36.

Plunger 36 includes head 42, from which an annular array of bent rod fingers 44 depend. Operating handle or knob 46 is mounted on top of plunger 36. Fingers 44 are arranged to freely engage within wedge-shaped spaces 48 between blades 20. Fingers 44 as shown in FIG. 5, include elongated rods 62 having upwardly inclined feet 64 at their lower ends with a curved junction 66 between them. FIG. 6 shows the circular array of ends 68 of fingers 44 having a circular space 70 between them. Upper arms 72 of fingers 44 are also bent inwardly with their inner extremities 74 bent parallel to elongated rods 62.

Upper arms 72 of fingers 44 are secured to plunger 36 by hub 76, which is attached under plunger 36 by central screw 78. Fingers 44 are secured against rotation by insertion of rods 62 in slots 80 in the periphery of hub 76, and the insertion of extremities or pegs 74 of fingers 44 in holes 82 in hub 76. Grooves 84 under plunger 36 also receive and capture arms 72 of fingers 44. Fingers 44 are stiff but resilient to help guide their feet 64 within wedge-shaped space 48 between blades 20. Fingers 44 are accordingly conveniently made of a stiff resilient metal wire, such as stainless steel, which is ⅛ inch in diameter.

Radial indexing of blade array 18 is accomplished, as shown in FIGS. 5 and 8, by engagement of thumb screw 50 in internally threaded ferrule 52 on blade ring 26. Blade array 18 is locked within recess 28 by thumb screw 50 extending through hole 54 in base 30. Sufficient clearance is provided between outer ring 26 and recess 28 to facilitate insertion and removal of conical blade cup 18 for cleaning and sharpening. The sharp inner surfaces 56 of blades 20 are sharpened in a double bevel to facilitate their splitting action.

The included angle of conical blade cup 18 is designated by letter "A" and arcuate arrowheads in FIG. 5A. Included angle A ranges for example from approximately 60° to 120°, preferably from about 75° to 105° and most effectively is about 90° shown. Blades 20 of any suitable number may be provided, as well as the twelve shown for device 10, which provide 12 wedges or sections. Half of the blades may, for example, be omitted to provide only six sections which are especially suitable for tomatoes.

Spike 22 is, for example, about two and one-half inches long. Spike 22 has a conical point 58, which is approximately one-half inch long. Spike 22 also is from about 3/16 inch thick to initiate the axial rupture of an impaled article 12 which is radially continued and completed by the sharp inner edges of conical blade array 18. The stem 21 of spike 22 within conical blade cup 18 provides a convenient means of attachment for the inner edges 60 of blade 20 and may be suitably flattened or recessed to receive inner edges 60 of blades 20. About one-half inch of spike 22 extends below the bottom point of conical blade cup 18.

OPERATION

Plunger 36 is raised high enough to permit a rounded food article such as lemon 12 to be centrally impaled on spike 22 and thus held in alignment for subsequent downward movement of plunger 36 from the raised position shown in FIG. 5 to the closed position shown in FIGS. 1, 3 and 4.

FIGS. 1, 3 and 4 show the fully downward or fully engaged position of plunger 36 in which the lower ends 71 of fingers 44 have passed completely through and slightly past the bottom edges 73 of blades 20 to thus discharge wedges 14 onto table 16.

The clean splitting action of device 10 is highly facilitated by the axial rupture performed by spike 22, which is radially continued and completed by sharpened edges 57 of blades 20. The cooperation between spike 22 and sharp edges 57 facilitates the clean sectioning of a soft but tough skinned food article, such as a lemon.

The splitting action of device 10 is so effective that it can be successfully performed on other food articles such as fresh and pickled tomatoes. Other rounded food articles, such as oranges, apples, hard boild eggs, and potatoes are also cleanly and swiftly sectioned by device 10. The substantial mass of plunger 36, which is for example made of cast metal, such as white metal or aluminum, facilitates its downward action which is similar to a multi-bladed guillotine. Base 30 may also be conveniently cast of the aforementioned types of metal. Slide rods 38 also may be similarly fabricated or made of hollow stainless steel or aluminum tubing. Downward movement of plunger 36 toward base 30 is smoothly arrested with shock absorption by rubber washers 75 mounted at the bases of slide rods 38.

Device 10 can uniquely provide twelve cut wedges or sections of a rounded food article as a result of its thin resilient elongated fingers 44 made of resilient elongated rods. When rods 44 are bent from relatively thick wire, they are very slim and can smoothly enter into wedge-shaped spaces 48 as shown in FIG. 4 with adequate clearance and ends 68 of feet 64 in close proximity to stem 21 of spike 22. The disposition of curved junctions 66 of rods 44 at a lower position than ends 68 of feet 64 causes the outer curved end 66 to first enter into the wider outer portion of wedge-shaped spaces 48. Any misalignment of feet 64 and their ends 68 can thus be corrected and realigned within wedge-shaped spaces 48 when the inner ends 68 finally pass into and through wedge-shaped space 48.

The wire configuration of fingers 44 also facilitates securing their upper ends to plunger 36 in a manner which promotes the resilient action of fingers 44. The free disposition of spike 22 with its lower end 23 extending about ¾ inch below conical cup of blades 18 also promotes efficient splitting action for device 10. The disposition of conical point 58 of spike 22 about ½ inch below the entrance to cup 18 facilitates initial centering of the food article in cup 18 and helps initiate the axial rupture of an impaled article, such as a lemon 12.

I claim:

1. A device for sectioning a rounded food article comprising a base, a conical cup of internally sharp radial blades mounted in the base and having an apex disposed towards the base with substantially wedge-shaped spaces between the blades, a plunger, slide guide means connecting the plunger for reciprocating movement towards the base and return, the plunger including a annular array of fingers depending from it which freely engage within the wedge-shaped spaces between the radial blades when the plunger is moved towards the blades, the fingers each comprising a linear element having two ends, one end of each of the fingers being attached to the plunger and the other end being free, stop means on the base and plunger for terminating their engagement with each other, the fingers being long enough to substantially pass through the blades when the movement of the plunger into engagement with the base is terminated, a spike having a point and a stem centrally mounted at the central junction of the blades to form their apex disposed within the cup, the point of the spike extending upwardly adjacent the entrance to the cup for holding the article aligned for engagement by the plunger and for initiating the radial splitting of the article which is continued and completed by the blades, the stem of the spike freely terminating a short distance below the cup of blades, the fingers each comprising an elongated resilient rod having an inwardly bent foot, the inwardly bent feet terminating in a circular array leaving a circular space between their ends for receiving the spike, the inwardly bent feet also being upwardly inclined from their junctions with the rods to inwardly disposed ends whereby the rods are guided through the wedge-shaped spaces with their feet in smooth contact with the article they are pushing through the conical cup of blades.

2. A device as set forth in claim 1 wherien the junctions of the elongated rods with their inwardly bent feet are curved and are disposed below the feet.

3. A device as set forth in claim 2 wherein the elongated rods comprise relatively thick metal wires.

4. A device as set forth in claim 3 wherein the inner ends of the feet are disposed in a circular array which substantially closely receives the spike between them when the fingers engage within the wedge-shaped spaces.

5. A device as set forth in claim4 wherein the metal wires are about ⅛ inch thick.

6. A device as set forth in claim 1 wherein the upper arms of the rods adjacent the plunger are inwardly bent, the plunger having a hub disposed on its lower end between the elongated rods, and securing means removably attaching the hub to the bottom of the plunger with the upper bent arms of the rods removably captured between the hub and the bottom of the plunger.

7. A device as set forth in claim 6 wherein the inner extremities of the upper arms are bent to lie parallel to the rods to provide locking pegs, the hub includes slots at its periphery for receiving the elongated rods, and a circular array of holes in a substantially central area of the hub for removably receiving the pegs whereby the fingers are securely attached to the hub in a relatively stiff but resilient and non-rotating annular array.

8. A device as set forth in claim 1 wherein the point of the spike is disposed approximately ½ inch below the mouth of the conical cup of blades.

9. A device as set forth in claim 8 wherein the bottom end of the spike extends approximately ¾ inch below the bottom of the conical cup of blades.

10. A device as set forth in claim 8 wherein the spike is approximately 3/16 inch in diameter.

11. A device as set forth in claim 1 wherein the conical cup of blades has an included angle ranging from approximately 60° to 120°.

12. A device as set forth in claim 1 wherein the conical cup of blades has an included angle ranging from approximately 75° to 105°.

13. A device as set forth in claim 1 wherein the conical cup of blades has an included angle of about 90°.

14. A device as set forth in claim 1 wherein legs extend downwardly from the base for elevating it above a working surface to permit the sections of the food article to be discharged from the device.

15. A device as set forth in claim 1 wherein the slide guide means comprises a pair of vertical rods mounted on the base at the sides of the blades and a pair of slide bearings on the plunger engaging the rods.

* * * * *